US012458567B2

(12) United States Patent
Matthews et al.

(10) Patent No.: US 12,458,567 B2
(45) Date of Patent: Nov. 4, 2025

(54) ADAPTER FOR CONNECTING A DISPENSER TO A CONTAINER

(71) Applicant: HOFFMANN-LA ROCHE INC., Little Falls, NJ (US)

(72) Inventors: Ian James Matthews, Basel (CH); Thomas Thueer, Basel (CH); Neil Bentley Cammish, Manchester (GB)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 400 days.

(21) Appl. No.: 18/065,973

(22) Filed: Dec. 14, 2022

(65) Prior Publication Data

US 2023/0181420 A1 Jun. 15, 2023

(30) Foreign Application Priority Data

Dec. 15, 2021 (EP) .................................... 21214632

(51) Int. Cl.
*A61J 1/20* (2006.01)

(52) U.S. Cl.
CPC .................................. *A61J 1/2048* (2015.05)

(58) Field of Classification Search
CPC .................................................... A61J 1/2048
See application file for complete search history.

(56) References Cited

U.S. PATENT DOCUMENTS 3,966,099 A * 6/1976 Sanford, Jr. ......... B67D 3/0051 222/567
8,944,297 B2 * 2/2015 Agassi .................. B65D 47/12 222/481.5
10,329,054 B1 * 6/2019 Haldiman ............ B65D 47/243
2010/0230447 A1 * 9/2010 Eriksen .................. B65D 47/40 222/481.5

(Continued)

FOREIGN PATENT DOCUMENTS

CH 345259 A * 3/1960
GB 1416865 A * 12/1975 ............. B65D 39/00

(Continued)

OTHER PUBLICATIONS

Machine Translation of CH-345259-A.*

(Continued)

*Primary Examiner* — Jeremy Carroll
(74) *Attorney, Agent, or Firm* — MEDLER FERRO WOODHOUSE & MILLS PLLC

(57) ABSTRACT

An adapter (1) for connecting a dispenser to a container having a neck with an interior passage comprises a body portion (2) with a container end (27) and a dispenser end (23, 25) opposite to the container end (27). The body portion (2) has a longitudinal axis (21) centrally extending between the dispenser end (23, 25) and the container end (27), and an essentially cylindrical outer surface (22). The body portion (2) comprises sealing lamellas (24) outwardly extending from the outer surface (22). The sealing lamellas (24) of the body portion (2) are spaced from each other along the (Continued)

longitudinal axis (21). Each of the sealing lamellas (24) of the body portion (2) has a root end adjoining the outer surface (22) of the body portion (2). The root ends of at least two neighboring sealing lamellas (24) have different thicknesses.

19 Claims, 3 Drawing Sheets

(56) References Cited

U.S. PATENT DOCUMENTS

| | | | | |
|---|---|---|---|---|
| 2013/0102989 | A1* | 4/2013 | McCoy | A61J 1/20 604/403 |
| 2018/0344570 | A1 | 12/2018 | Davis et al. | |
| 2020/0146936 | A1* | 5/2020 | Davies | A61J 7/0053 |

FOREIGN PATENT DOCUMENTS

| | | | |
|---|---|---|---|
| GB | 2045730 | A | 11/1980 |
| WO | 2007049959 | A3 | 5/2007 |

OTHER PUBLICATIONS

Machine Translation of GB-1416865-A.*
Search Report issued Jun. 9, 2022, in corresponding EP Appl. No. 21 214 632.8.
Communication under Rule 71(3) EPC issued Jun. 24, 2025 in EP Appl. No. 22 838 741.1.

* cited by examiner

ADAPTER FOR CONNECTING A DISPENSER TO A CONTAINER

TECHNICAL FIELD

The present invention relates to an adapter comprising a body portion with a container end and a dispenser end opposite to the container end, wherein the dispenser end of the body portion may have an orifice, the body portion has a longitudinal axis centrally extending between the dispenser end and the container end, and an essentially cylindrical outer surface, the body portion comprises sealing lamellas outwardly extending from the outer surface, and the sealing lamellas of the body portion are spaced from each other along the longitudinal axis, can be used for connecting a dispenser to a container having a neck with an interior passage.

BACKGROUND

Today, pharmaceutical substances are frequently administered in liquid form. However, many pharmaceutical substances and particularly biopharmaceutical substances are highly unstable in liquid form. Therefore, often pharmaceutical substances are provided in a freeze-dried or lyophilized form in which they are essentially more stable and robust compared to its liquid form. Before being applied, the lyophilized pharmaceutical substances are reconstituted or solved in a diluent or liquid.

Lyophilized pharmaceutical substances or drugs are often delivered in a suitable container having a neck with an interior passage. For example, glass or plastic bottles and similar containers are used in this context. Also other liquid pharmaceutical substances are commonly provided in such containers as, e.g., bottles.

To allow reconstitution of lyophilized drugs and/or provision of a specific dosage out of containers housing liquid pharmaceutical substances, dispensers such as scaled oral syringes can be used. E.g., for administration, a dosage of the drug can be withdrawn by the oral dispenser. For connecting dispensers to containers, it is known to use adapters which allow for a precise and essentially leakage-free provision of liquids into containers and/or withdrawal liquids from containers.

Common embodiments of adapters of this kind are to be pushed into the neck of the containers where they are tightly positioned. Typically, provision of sufficient tightness is established by a seal connection between the adapter and the neck of the container. However, such seal connection usually requires a comparably strong insertion force when advancing the adapter into the neck of the container. This can make accurate connecting of the adapter and the container comparably difficult, for example with respect to preventing the container from falling or the like. Also, such push-in adapters can self-eject from the neck and have to be re-inserted before connecting a dispenser to the container. In addition, the handling of push-in adapters in some instances forces the user to touch or contact the dosing orifice of the pushed-in adapter.

For providing an appropriate balance between high tightness versus low insertion force, known adapters are equipped with a number of radially extending sealing lamellas. When being pushed-in the container the lamellas are bent against a direction of insertion and elastically forced against the interior wall of the neck of the container. However, also with such adapters there remains a risk that, due to the required insertion force, the adapters are not fully inserted into the neck. Thereby, prevention of leakage may still not satisfyingly be achieved. Also, self-ejection of the adapter may not be sufficiently be prevented.

Therefore, there is a need for an adapter providing for an efficient and safe connection of a dispenser to a container particularly in order to allow the dispenser to precisely and safely withdraw a substance from the container.

SUMMARY OF THE INVENTION

According to the invention this need is settled by an adapter according to the present invention.

In particular, the invention is an adapter for connecting a dispenser to a container having a neck with an interior passage. The adapter comprises a body portion with a container end and a dispenser end opposite to the container end. The body portion has a longitudinal axis centrally extending between the dispenser end and the container end, and an essentially cylindrical outer surface. The body portion comprises sealing lamellas outwardly extending from the outer surface. The sealing lamellas of the body portion are spaced from each other along the longitudinal axis. Each of the sealing lamellas of the body portion has a root end adjoining the outer surface of the body portion. The root ends of at least two neighbouring sealing lamellas have different thicknesses.

The dispenser for which the adapter is intended to be used for can be a dispenser for administering the liquid pharmaceutical liquid of the container to a patient. For example, it can be a dosage dispenser or an oral dispenser such as a syringe or an enteral dispenser. Or, the dispenser can be a device for providing a liquid such as a reconstitution medium into the container. For example, such provision can be needed for reconstituting a lyophilized drug in the container. Syringes are commonly used for dosing substances from containers as well as for providing liquids into containers.

The term "drug" as used herein relates to a therapeutically active agent, also commonly called active pharmaceutical ingredient (API), as well as to a combination of plural such therapeutically active substances. The term also encompasses diagnostic or imaging agents, like for example contrast agents (e.g. MM contrast agents), tracers (e.g. PET tracers) and hormones, that need to be administered in liquid form to the patient.

The term "drug substance" as used herein relates to a drug as defined above formulated or reconstituted in a form that is suitable for administration to the patient. For example, besides the drug, a drug substance may additionally comprise an excipient and/or other auxiliary ingredients. A particularly preferred drug substance in the context of the invention can be a drug solution, in particular a solution for oral administration, injection or infusion.

The term "drug product" as used herein relates to a finished end product comprising a drug substance or a plurality of drug substances. In particular, a drug product may be a ready to use product having the drug substance in an appropriate dosage and/or in an appropriate form for administration. For example, a drug product may include an administration device such as a prefilled syringe or the like.

The term "cylindrical" as used in connection with the outer and inner surfaces of the body portion as well as with other parts specified in the following can relate to an essentially cylindrical shape. In particular, it can relate to a circular cylindrical shape. The term does also include partially cylindrical shapes wherein the cylindrical portions have to be sufficiently large to allow a rotational movement.

The container for which the adapter is embodied for can particularly be a bottle. Such bottles are typically made of glass or a plastic material. Thereby, the neck of the container can be ending in an opening of the container through which the interior of the container can be accessed via the passage.

The adapter according to the invention can be referred to as Push In Bottle Adapter (MBA). It can be manufactured of a plastic material and particularly an inert plastic material.

The term "longitudinal axis" in connection with the body portion can particularly relate to an axis along which the body portion mainly extends. The longitudinal axis can be the main or central axis of the cylinder formed by the outer surface of the body portion.

The body portion can be a single-piece or monolithic element. It can be made of polymeric material such as a polyethylene or polypropylene. Advantageously, it is made of a linear low density polyethylene (LLDPE).

In an advantageous embodiment, the body portion is essentially rotational symmetric. Thereby, the term "essentially rotational symmetric" refers to a design which particularly at an outside is mostly rotational symmetric in the literal sense. It may also include portions not being strictly rotational symmetric, particularly at the interior of the body portion, which may be embodied with auxiliary structures in connection with manufacturing the body portion. However, the outer surface of the body portion advantageously is rotational symmetric. This allows for a convenient handling of the adapter irrespective of its orientation. In such embodiments, the longitudinal axis may be the axis or rotation about which the body portion is essentially symmetric.

The sealing lamellas can be arranged around the complete circumference of the outer surface of the body portion. Moreover, they can be essentially ring shaped.

The thicknesses of the root end of each sealing lamella can be a diameter of the respective lamella at its root end. In other words, the thickness can be the internal extension of the root end in an axial direction. When being positioned in an upright position, the thickness can be an essentially vertical diameter or internal extension of the sealing lamella.

The body portion is configured such that, for closing the container, the outer surface and the sealing lamellas are advanced into the passage of the container. Thereby, the sealing lamellas are arranged to bend or deform when being advanced into the passage such that they are strained between the outer surface of the body portion and the wall of the passage, and tightly contact the passage wall. Like this, the passage can be sealed and the adapter can be securely held in the passage.

The container end of the body portion is the end of the body portion into a direction along the longitudinal axis which is the first section of the body portion to be at the container when the adapter is advanced into the passage of the container. The container end can also be referred to as distal end of the body portion.

The term "distal" in connection with the adapter relates to a side of the body portion or a direction which is oriented towards the container when the adapter is mounted to the container. After being mounted, the distal end can reside inside the container. The distal end typically is the first section arriving the container, when the adapter is mounted to the container.

In contrast, the dispenser end of the body portion can be referred to as proximal end. The term "proximal" as used herein relates to a side of the body portion or a direction opposite to distal, i.e. oriented away from the container when the adapter is mounted to the container. Typically, the proximal end of the body portion is located outside the container when the adapter is fully mounted to the container.

The dispenser or proximal end of the body portion can be equipped with an orifice. The orifice can be embodied to receive the dispenser or a portion thereof such as a dispenser tip or the like. Thereby, it can be arranged such that the dispenser can be pushed or rotated through for accessing a substance in the interior of the container. In particular, receiving the dispenser can be implemented by simply manually pushing the dispenser onto the adapter thereby forcing a dispenser tip or the like through the orifice.

Alternatively, for the same purpose the dispenser can be connected to the adapter, for example, by means of a standardized fitting such as a fitting in accordance with the standard DIN EN ISO 80369. More specifically, the dispenser end can be designed to be compliant with a fitting for enteral connections in accordance with ISO standard 80369-3 (ENFit). In such embodiments, the adapter can be provided with a respective male or female portion of such a fitting. When the dispenser is removed, the orifice can automatically be closed and sealed again. Thus, it can be repeatedly accessed.

By providing the sealing lamellas of the adapter with varyingly thick root ends, the insertion force behaviour can be specifically adapted and defined in accordance with the given situation. In particular, it has been found that the thickness of the lamella at its root end crucially defines the resistance induced by the respective lamella when inserting the adapter. Thus, depending on the form and geometry of the passage of the neck of the containers involved, the thicknesses of the root ends of the sealing lamellas can efficiently predefine the insertion force behaviour of the adapter. Like this, the adapter can specifically be designed to achieve a complete advancement of the adapter into the neck of the container where it is securely and tightly held. For example, it can be aimed at achieving a uniform insertion force through the complete insertion.

Thus, the adapter according to the invention allows for a convenient handling in particular assuring sufficient tightness and preventing that the dispenser end is touched or contacted when the adapter is used.

Preferably, the sealing lamella of all sealing lamellas closest to the container end of the body portion has the thickest root end. Thus, the sealing lamella with the thickest root end particularly is the most distal one or the sealing lamella being closest to the container end.

By designing the sealing lamellas in this manner, it can be achieved that the highest portion of the insertion force is induced by the first sealing lamella advanced into the neck of the container. This results in a higher or the highest portion of the insertion force to be applied in the beginning of pushing the adapter into the container. As users typically push the adapter more or less uniformly, such embodiment may ensure that the adapter is completely advanced into the passage of the neck of the container. More specifically, as a user has to apply the comparably high force in the beginning of the push-in procedure and typically a similarly high insertion force will be applied during the complete push-in procedure, it is assured that the adapter is properly and completely inserted into the neck of the container.

The sealing lamella closest to the dispenser end of the body portion preferably has the thinnest root end. By such design it can be achieved that the last sealing lamella inserted into the neck induces the smallest insertion force. Like this, it can be achieved that also this last sealing lamella is properly and completely inserted.

Thereby, the thicknesses of root ends of the sealing lamellas preferably are reduced one after the other from the sealing lamella closest to the container end to the sealing lamella closest to the dispenser end. Like this, it can be achieved that the insertion force is reduced step by step or kept at a constant level when pushing the adapter into the neck of the container. This allows for particularly convenient and secure complete pushing-in of the adapter.

Preferably, each of the sealing lamellas of the body portion has a tip end opposite to the root end. Particularly, the tip end is opposite to the root end in an outward or direction of the sealing lamella.

Thereby, the tip end of each lamella preferably is thinner than its root end. Such thinner tip ends allow for achieving an efficient sealing between the sealing lamellas and the passage of the neck of the container.

Each lamella preferably tapers from the root end to the tip end. In other words, the sealing lamellas taper in an outward or radial direction. By such design of the sealing lamellas a particularly beneficial bending behaviour can be achieved such that a proper sealing can be established.

Each of the sealing lamellas preferably has a length extending between the root end and the tip end, wherein at least two neighbouring sealing lamellas have different lengths. The lengths of the sealing lamellas can also be referred to as diameters or radii of the lamellas.

The length of the sealing lamellas establishes a crucial feature as to tightness provided by the sealing lamellas. By providing varying lengths in the sealing lamellas, the sealing behaviour of the adapter can be predefined. In particular, as the passages of necks of many containers typically are not uniformly cylindrical, the varying length of the lamellas may achieve a proper sealing adapted to the specific container involved. For example, when manufacturing glass bottles, the passages typically have slightly varying diameters along the necks due to manufacturing tolerances and properties of glass. Such variations can be considered when designing the sealing lamellas of the adapter, e.g., by varying the lengths accordingly. Thus, a highly accurate tightness can be achieved.

Thereby, the length of the sealing lamella closest to the container end preferably is smaller than the length of the next neighbouring sealing lamella. This next neighbouring sealing lamella can be the second most distal sealing lamella.

Preferably, the body portion comprises two to eight sealing lamellas or two to five sealing lamellas and, particularly, three sealing lamellas. Such number of lamellas allows for providing sufficient flexibility in design and sufficient tightness in many applications.

Preferably, the sealing lamellas extend from the outer surface in an essentially radial direction relative to the central axis.

Preferably, each of the sealing lamellas of the body portion has a proximal side perpendicular to the outer surface of the body portion. Thereby, the proximal side can be essentially flat. Such arrangement allows for efficiently providing radial sealing lamellas.

Preferably, each of the sealing lamellas of the body portion has a distal side slanted to the outer surface of the body portion. The slanted side may be flat or curved. It allows for a smooth insertion of the adapter and, particularly, bending of the sealing lamellas into a proximal direction when inserting the adapter.

Preferably, distances between different neighboring sealing lamellas vary. Thus, the sealing lamellas may be non-uniformly distant from each other. This allows for providing appropriate tightness in containers having non-uniform passages in their necks. Also, it allows for providing a sufficient or suitable bending of the sealing lamellas when the body portion is advanced into the passage of the neck of the container.

Thereby, a distance between the sealing lamella closest to the container end and its neighboring sealing lamella advantageously is smaller than a distance between the sealing lamella closest to the dispenser end and its neighboring sealing lamella.

Preferably, the adapter comprises a flange portion at the dispenser end. Such flange portion may provide an end of the adapter. Thereby, the flange portion preferably is more rigid than the sealing lamellas. The flange portion forms a stop preventing further advancement of the body portion into the neck of the container.

Preferably, the adapter comprises a gasket arranged at the flange portion. The gasket can particularly be made of a comparably compressible or soft and typically elastic material such as an elastomeric material. Advantageously, the gasket is made of a thermoplastic elastomer (TPE). Such gasket allows for additionally sealing the neck of the container to the adapter.

Thereby, the flange portion preferably has a distal side and the gasket preferably, is mounted to the distal side of the flange portion. After advancing the body portion into the passage of the container, the flange portion may abut an edge of the neck of the container such that the gasket is compressed in between the edge and the flange portion, thereby, providing additional tightness.

The adapter may comprise a dosing chamber which is arranged adjacent to the orifice such that it is accessible by the dispenser through the orifice. Such a dosing chamber may exactly define the dosage the dispenser can withdraw from the container. Thus, it is possible to assure removal of a predefined dosage from the container. The dosage chamber can, e.g. be arranged such that it is filled when the container is turned upside down but not when being in an upright position.

These and other aspects of the invention will be apparent from and elucidated with reference to the embodiments described hereinafter.

BRIEF DESCRIPTION OF THE DRAWINGS

The adapter according to the invention is described in more detail herein below by way of exemplary embodiments and with reference to the attached drawings.

DETAILED DESCRIPTION OF EMBODIMENTS

In the following description certain terms are used for reasons of convenience and are not intended to limit the invention. The terms "right", "left", "up", "down", "top", "bottom", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
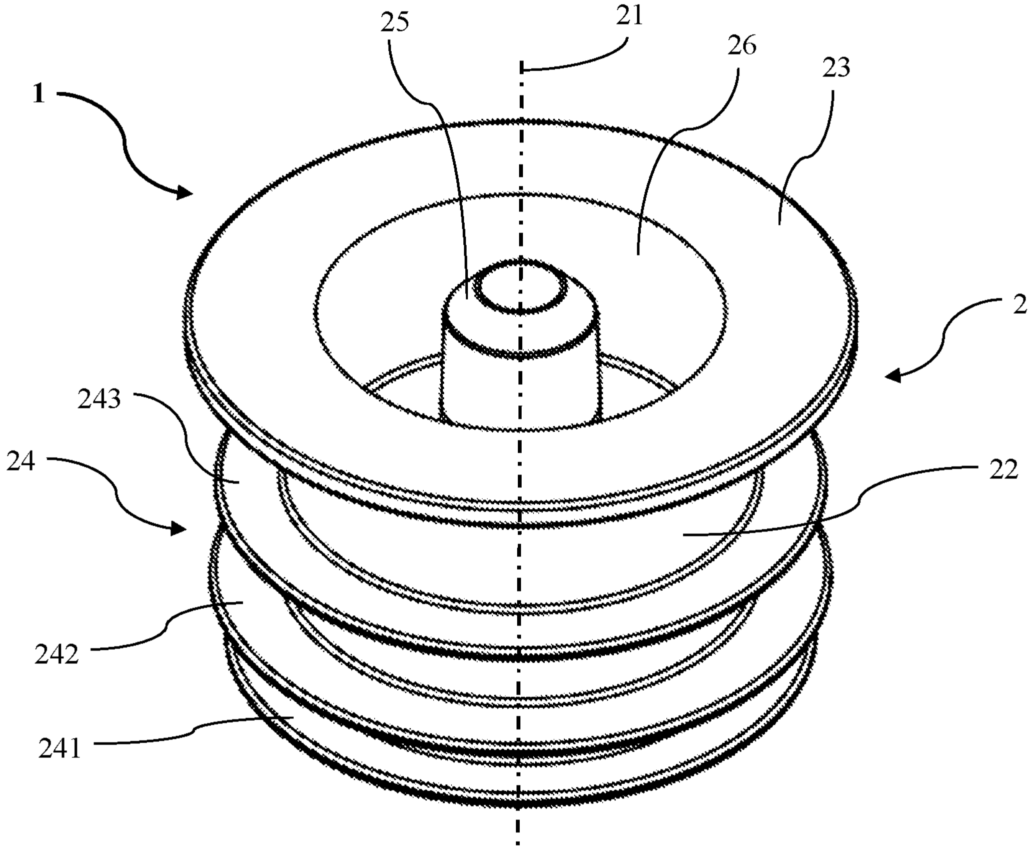
FIG. 1 shows a perspective top view of an embodiment of an adapter according to the invention.

FIG. 1 shows an adapter 1 for connecting a dispenser to a bottle as container. The adapter 1 is configured to be pushed in an interior passage of a neck of the bottle. The adapter 1 can be referred to as push-in bottle adapter (PIBA).

The adapter 1 has a body portion 2 with a centrally extending longitudinal axis 21, a cylindrical outer surface 22, a flange portion 23 and sealing lamellas 24. The flange portion 23 has a flat open upper surface and forms part of a dispenser end or proximal end of the body portion 2.

The sealing lamellas 24 outwardly extend from the outer surface 22 in a radial direction relative to the axis 21. They are embodied as rings extending about the complete circumference of the outer surface 22 and are spaced from each other along the axis 21. The sealing lamellas 24 consist of a distal sealing lamella 241, a middle sealing lamella 242 and a proximal sealing lamella 243. The proximal sealing lamella 243 is the one of the sealing lamellas 24 closest to the flange portion 243, i.e. closest to the dispenser end.

The dispenser end of the body portion 2 comprises a nozzle 25 with an orifice and a dispenser recess 26. The nozzle 25 and the dispenser recess 26 are designed as fitting in accordance with the ISO standard 80369-3 (ENFit). Like this, the adapter can reversibly be connected to a dispenser having a corresponding fitting.

Figure 2:
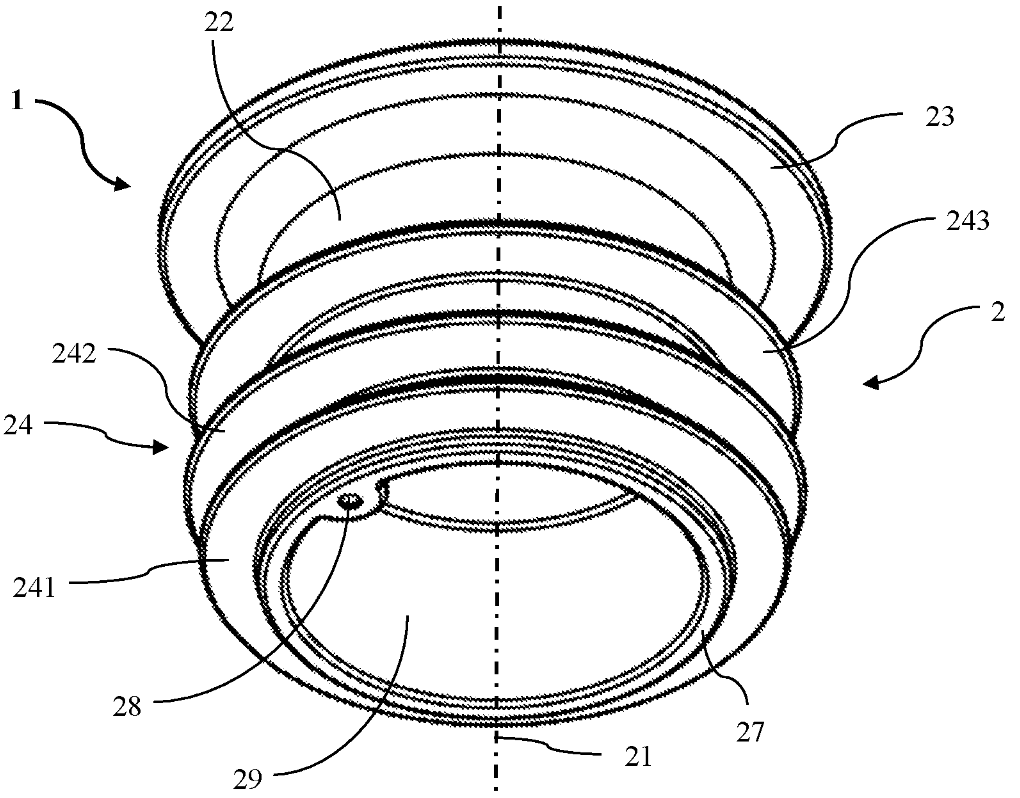
FIG. 2 shows a perspective bottom view of the adapter of FIG. 1.

In FIG. 2 the adapter is shown from below. Thereby, it can be seen that the body portion 2 comprises a cavity or hollow interior 29. A bottom end of the body portion 2 constitutes a distal end or container end 27 opposite to the dispenser end. The axis 21 extends between the dispenser end and the container end 27.

At a side wall of the interior 29 of the body portion, a gate structure 28 is arranged. The gate structure 28 is embodied in context of efficient injection moulding when manufacturing the body portion 2.

Figure 3:
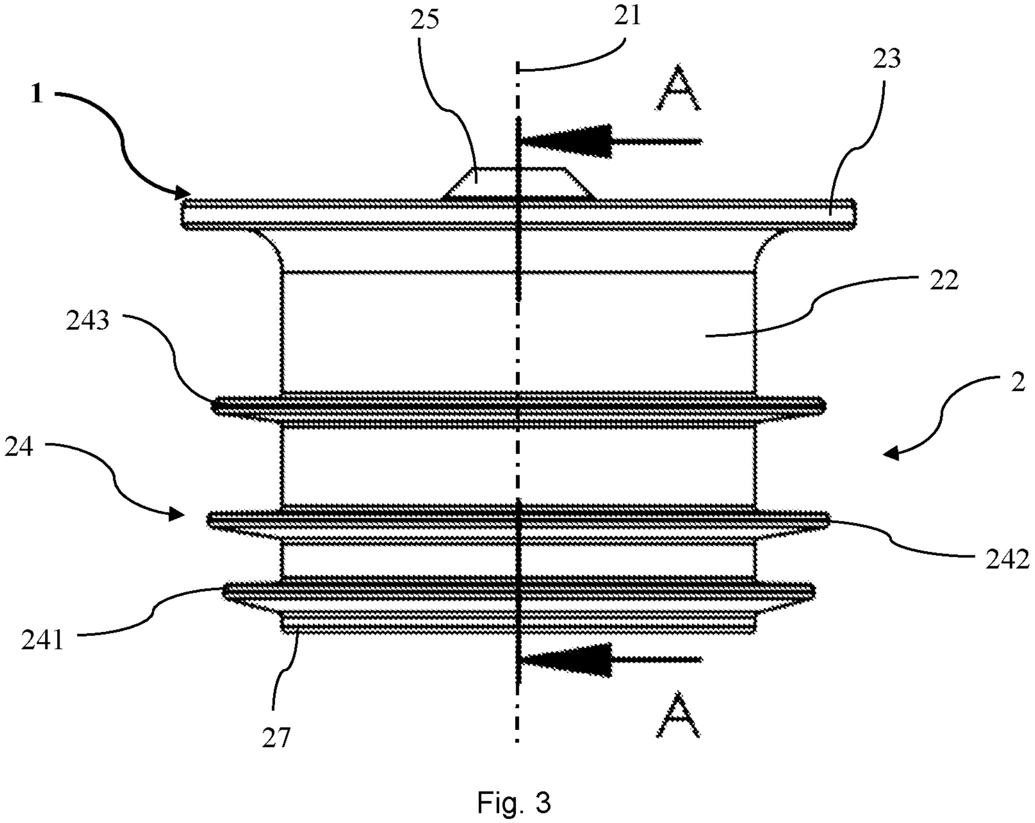
FIG. 3 shows a side sectional view of the adapter of FIG. 1.

FIG. 3 shows the adapter 1 from a side. As can be seen, the nozzle 25 distally projects over the flange portion 23 in an axial direction. Aside the gate structure 28, the adapter 1 is rotational symmetric relative to the axis 21 and, in particular, the body portion 2 is essentially rotational symmetric.

Optionally, the adapter can comprise a gasket 3. Such gasket can be essentially O-ring shaped and mounted to the flange portion 23. In particular, the gasket 3 can be adhered to the distal side of the flange portion 23.

Figure 4:
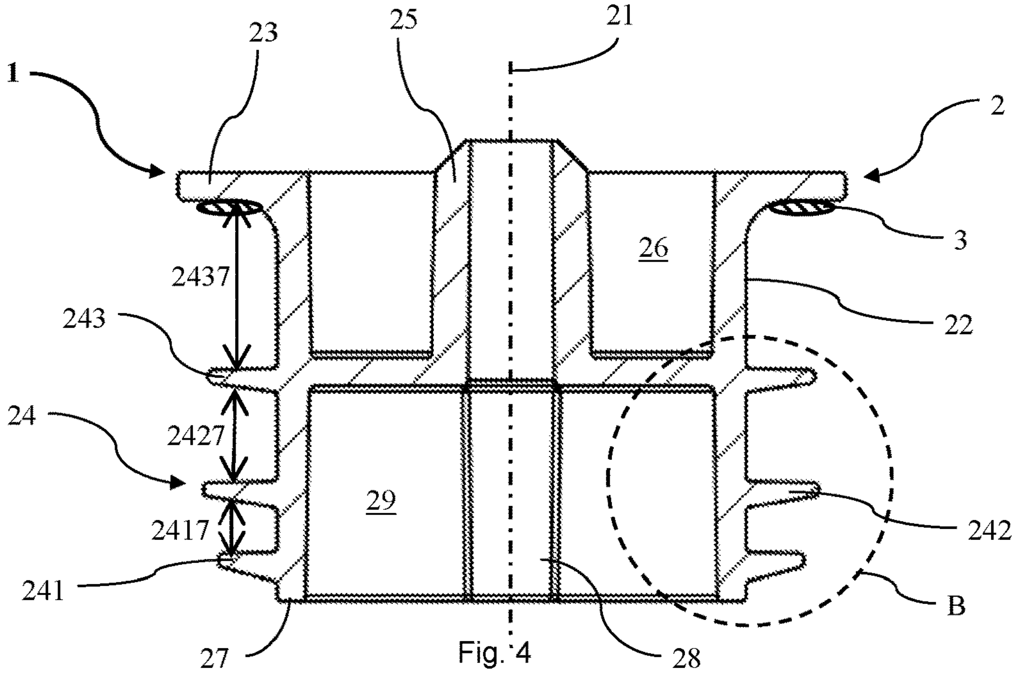
FIG. 4 shows a cross sectional view of the adapter along the plane A-A of FIG. 3.

In FIG. 4 the adapter 1 is depicted in a cross-sectional view. The gate structure 28 axially extends. The sealing lamellas 24 are located at varying distances relative to each other. In particular, a first distance 2417 between the distal sealing lamella 241 and the middle sealing lamella 242 is smaller than a second distance 2427 between the middle sealing lamella 242 and the proximal sealing lamella 243, which is smaller than a third distance 2437 between the proximal sealing lamella 243 and the flange portion 23.

Figure 5:
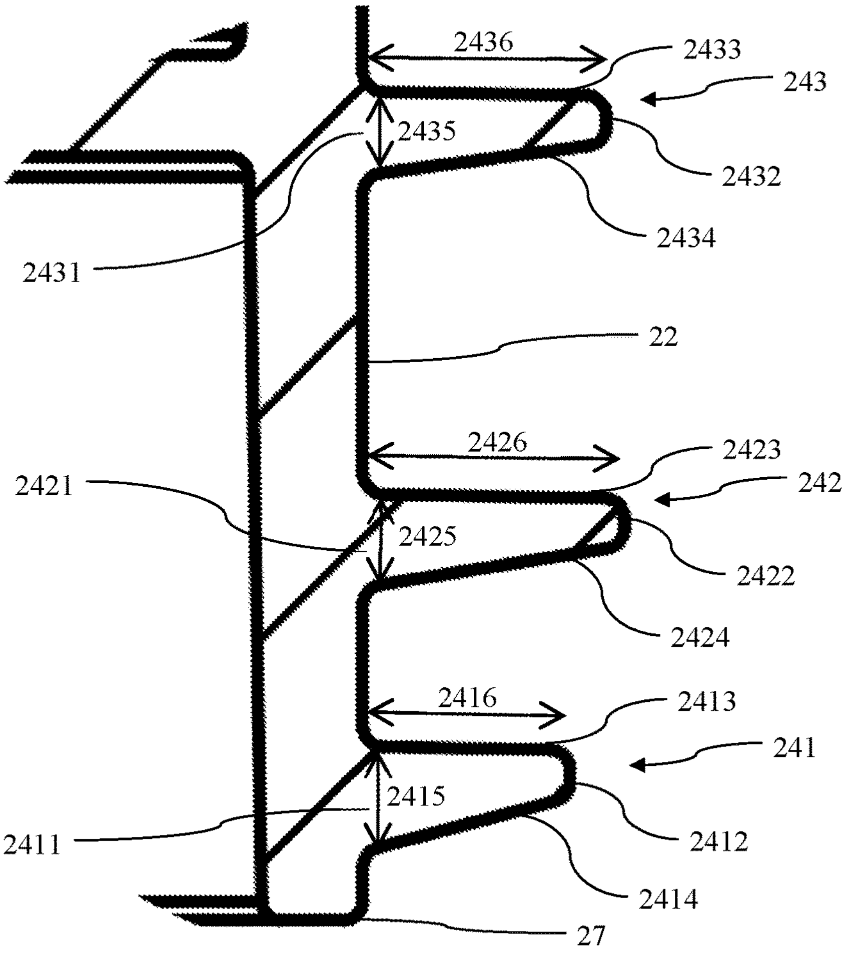
FIG. 5 shows detail B of the adapter of FIG. 4.

In FIG. 5, the sealing lamellas 24 are shown in more detail. The distal sealing lamella 241 has a first root end 2411, a first tip end 2412, a first proximal side 2413 and a first distal side 2414. The first root end 2411 adjoins the outer surface 22 and has a first thickness 2415. The first proximal side 2413 is equipped with a flat surface perpendicularly extending to the outer surface 22. The first distal side 2414 is slanted relative to the outer surface 22 and to the axis 21.

The distal sealing lamella 241 radially extends wherein it tapers from the first root end 2411 to the first tip end 2412 such that the first tip end 2412 is thinner than the first root end 2411. Thereby, the distal sealing lamella 241 has a first length 2416 along which it outwardly extends from the first root end 2411 to the first tip end 2412. The first tip end 2412 is rounded.

The middle sealing lamella 242 is similarly embodied as the distal sealing lamella 241. In particular, it has a second root end 2421, a second tip end 2422, a second proximal side 2423 and a second distal side 2424. The second root end 2421 adjoins the outer surface 22 and has a second thickness 2425. The second proximal side 2423 is equipped with a flat surface perpendicularly extending to the outer surface 22. The second distal side 2424 is slanted relative to the outer surface 22 and to the axis 21. The middle sealing lamella 242 radially extends wherein it tapers from the second root end 2421 to the second tip end 2422 such that the second tip end 2422 is thinner than the second root end 2421. The middle sealing lamella 242 has a second length 2426 along which it outwardly extends from the second root end 2421 to the second tip end 2422. The second tip end 2422 is rounded.

The proximal sealing lamella 243 is also similarly embodied as the distal sealing lamella 241 and as the middle sealing lamella 242. In particular, it has a third root end 2431, a third tip end 2432, a third proximal side 2433 and a third distal side 2434. The third root end 2431 adjoins the outer surface 22 and has a third thickness 2435. The third proximal side 2433 is equipped with a flat surface perpendicularly extending to the outer surface 22. The third distal side 2434 is slanted relative to the outer surface 22 and to the axis 21. The proximal sealing lamella 243 radially extends wherein it tapers from the third root end 2431 to the third tip end 2432 such that the third tip end 2432 is thinner than the third root end 2431. Thereby, the proximal sealing lamella

243 has a third length 2436 along which it outwardly extends from the third root end 2431 to the third tip end 2432. The third tip end 2432 is rounded.

The sealing lamellas 24 are designed and dimensioned to be proximally bent when pushing the body portion 2 into the passage of the neck of the bottle. For allowing an easier introduction into the passage, the sealing lamellas 24 are equipped with the slanted distal sides 2414, 2424, 2434. The flange portion 23 is embodied more rigid than the sealing lamellas 24 in order to prevent proximal bending. Like this, the flange portion 23 stops advancing the body portion 2 into the passage and stays outside the bottle abutting an edge of the neck.

Of the three sealing lamellas 24, the distal sealing lamella 241, i.e. the sealing lamella 241 closest to the container end 27, has the thickest root end 2415 and the proximal sealing lamella 243, i.e. the sealing lamella 243 closest to the dispenser end 23, has the thinnest root end 2435. More specifically, the first thickness 2415 is larger than the second thickness 2425 which is larger than the third thickness 2435. Thus, the thicknesses of root ends 2415, 2425, 2435 of the sealing lamellas 24 are reduced one after the other from the distal sealing lamella 241 to the proximal sealing lamella 243. For example, the second thickness 2425 can be in a range of about 85% to 95% or about 90% of the first thickness 2415. The third thickness 2435 can be in a range of about 75% to 85% or about 80% of the first thickness 2415.

By providing the distal sealing lamella 241 with the thickest root end 2411 it is achieved that the insertion force is comparably high at a level of the distal sealing lamella 241 when advancing the adapter 1 into the passage of the neck of the bottle. In particular, the comparably thick distal sealing lamella 241 provides a comparably high resistance for proximally bending the distal sealing lamella 241, which is required to allow insertion of the adapter 1 into the passage. Thus, it is prevented that the insertion increases after the distal sealing lamella 241. Thereby, it is possible that by applying a constant force, e.g. a pushing force, a complete insertion of the adapter 1 into the passage of the bottle is achieved.

As to the lengths of the sealing lamellas 24, the first length 2416 of the distal sealing lamella 241 is smaller than the second length 2426 of the middle sealing lamella 242. The third length 2436 of the proximal sealing lamella 243 is slightly smaller than the second length 2426 of the middle sealing lamella 242. By having varying lengths, the sealing lamellas 24 are adjusted to specifically suit to the passage of the neck of the bottle. For example, the first length 2416 can be in a range of about 75% to 85% of the second length 2426. The third length 2436 can be in a range of about 85% to 95% of the second length 2426.

This description and the accompanying drawings that illustrate aspects and embodiments of the present invention should not be taken as limiting—the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the FIGS. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

What is claimed is:

1. An adapter for connecting a dispenser to a container having a neck with an interior passage, comprising a body portion with a container end and a dispenser end opposite to the container end, wherein the body portion has a longitudinal axis centrally extending between the dispenser end and the container end, and an essentially cylindrical outer surface, the body portion comprises sealing lamellas outwardly extending from the outer surface, the sealing lamellas of the body portion are spaced from each other along the longitudinal axis, each of the sealing lamellas of the body portion has a root end adjoining the outer surface of the body portion, the root ends of at least two neighboring sealing lamellas have different thicknesses, and the sealing lamella closest to the container end of the body portion has the thickest root end.

2. The adapter of claim 1, wherein the sealing lamella closest to the dispenser end of the body portion has the thinnest root end.

3. The adapter of claim 2, wherein the thicknesses of root ends of the sealing lamellas are reduced one after the other from the sealing lamella closest to the container end to the sealing lamella closest to the dispenser end.

4. The adapter of claim 1, wherein each of the sealing lamellas of the body portion has a tip end opposite to the root end.

5. The adapter of claim 4, wherein the tip end of each sealing lamella is thinner than its root end.

6. The adapter of claim 4, wherein each of the sealing lamellas tapers from the root end to the tip end.

7. The adapter of claim 4, wherein each of the sealing lamellas has a length extending between the root end and the tip end, and wherein of at least two neighboring sealing lamellas have different lengths.

8. The adapter of claim 1, wherein the body portion comprises two to eight sealing lamellas or two to five sealing lamellas.

9. The adapter of claim 1, wherein the sealing lamellas extend from the outer surface in an essentially radial direction relative to the central axis.

10. The adapter of claim 1, wherein each of the sealing lamellas of the body portion has a proximal side perpendicular to the outer surface of the body portion.

11. The adapter of claim 1, wherein each of the sealing lamellas of the body portion has a distal side slanted to the outer surface of the body portion.

12. The adapter of claim 1, wherein distances between different neighboring sealing lamellas vary.

13. The adapter of claim 1, comprising a flange portion at the dispenser end.

14. The adapter of claim 13, comprising a gasket arranged at the flange portion.

15. The adapter of claim 7, wherein the length of the sealing lamella closest to the container end is smaller than the length of the next neighboring sealing lamella.

16. The adapter of claim 13, wherein the flange portion is more rigid than the sealing lamellas.

17. The adapter of claim 14, wherein the flange portion has a distal side.

18. The adapter of claim 17, wherein the gasket is mounted to the distal side of the flange portion.

19. The adapter of claim 1, wherein the body portion comprises three sealing lamellas.

* * * * *